—·—·— Mg$_{1.7}$ Ba$_{.3}$ P$_2$ O$_7$ : Sn – Plaque = 38 %

———— Mg Li-antimonate ; Ti – Plaque = 91%

– – – – – Ca WO$_7$ : Pb – Plaque 100%

WAVELENGTH IN MILLIMICRONS

RICHARD C. ROPP
*INVENTOR.*

BY
ATTORNEY

United States Patent Office
3,198,742
Patented Aug. 3, 1965

3,198,742
TIN ACTIVATED BARIUM-MAGNESIUM PYRO-PHOSPHATE PHOSPHORS
Richard C. Ropp, Towanda, Pa., assignor to Sylvania Electric Products Inc., a corporation of Delaware
Filed Dec. 5, 1962, Ser. No. 242,506
7 Claims. (Cl. 252—301.4)

This application is a continuation in part of my copending application Serial Number 30,639 filed May 20, 1962, and now abandoned.

This invention relates to phosphors which can be used in cathode ray tubes, fluorescent tubes and the like. More specifically, this invention relates to new phosphors derived from a stannous tin-activated barium magnesium pyrophosphate system.

Tin-activated phosphors are well known in the art. For example, the U.S. patent to Butler, No. 2,619,471, describes a tin-activated calcium phosphate or in the U.S. Patent 2,826,553, Butler discloses a tin-activated calcium-strontium system which has a deep blue emission. Each of these phosphors is prepared by a double firing method in which the first firing takes place in air or other oxidizing media and the second takes place in a slightly reducing atmosphere. A mixture of hydrogen and nitrogen has been suitable for these purposes. The second step serves as an insurance that the tin activator will be in a lower valence state.

It is known, however, that this second firing step can be eliminated if an ammonia compound is incorporated into the raw material mixture before any firing. Such ammonia compounds should be decomposable upon heating to yield ammonia and a byproduct which is non-deleterious to the phosphor for example, ammonium chloride, diammonium hydrogen phosphate, ammonium carbonate or ammonium oxalate. The amount of this ammonia compound should be within certain limits for the best results. For example, the total ammonia content of the mixture to be fired should be within of .12 to 1.4 moles of ammonia per mole of pyrophosphate. Above this range, the brightness of the phosphor will be diminished and below it there will not be a sufficient reducing atmosphere to prevent oxidation of the tin.

Disclosed in the U.S. patent to McKeag, No. 2,730,504 is a tin-activated barium pyrophosphate phosphor having a red emission which is variable by changing the molar ratio of the barium to the phosphate. An article by Ranby et al., British Journal of Applied Physics, No. 4, page 18 (1954) discloses a barium pyrophosphate phosphor and a strontium pyrophosphate phosphor, each of which is activated by tin. It is also disclosed that mixtures of these phosphors can be made or it is possible to mix them with calcium pyrophosphate. The barium pyrophosphate phosphor described in this article exhibits two crystalline modifications. At firing temperatures less than about 790° C. a green emitting phosphor having structure isomorphous with $\alpha Ca_2P_2O_7$ and $\alpha Sr_2P_2O_7$ is produced. With higher firing temperatures a new structure appears ($\delta$—$Ba_2P_2O_7$) which has a reddish pink emission.

It has been determined that the magnesium pyrophosphate cannot be activated by tin to produce an efficient phosphor. But it has been discovered however, that by adding amounts of barium pyrophosphate phosphor to the magnesium pyrophosphate, mixed phosphors are produced which are quite efficient and exhibit unique properties, not obtainable otherwise. And furthermore, it has been discovered that the addition of the magnesium pyrophosphate phosphor to stannous tin-activated barium pyrophosphate produces a blue-green phosphor with superior brightness. This phosphor is stable over a wider temperature range than the blue-green emitting phosphor such as described by Ranby.

The blue-green phosphor disclosed by Ranby is a low temperature form of $Ba_2P_2O_7$:Sn and has a very dull emission. I have found that it is difficult to prepare a phosphor of this type having good brightness due to the ease in which the low temperature form ($\alpha$—$Ba_2P_2O_7$) converts into the high temperature form ($\delta$—$Ba_2P_2O_7$). But if the firing temperatures are kept low enough to prevent this conversion, the resulting phosphors are essentially inert.

The blue-green phosphor of this invention ($\alpha BaMgP_2O_7$:Sn)

is a low temperature form similar in structure to the low temperature form described by Ranby, but having a stability over a wide range of temperatures. Furthermore, phosphors of excellent brightness can be obtained, contrary to any results in the $Ba_2P_2O_7$:Sn phosphor system.

In the barium-magnesium pyrophosphate phosphor system of this invention there are two additional forms, pink emitting $\delta$—$BaMgP_2O_7$:Sn and violet emitting $MgBaP_2O_7$:Sn the former not being a practical phosphor. Of these additional phosphors, the violet emitting one presents a substantial advantage over the tin-activated phosphors of the prior art.

It is apparent that materials of different compositions differ also in the color of efficiency of their luminescence or in radiations by which they are excited or in two or more of these properties. It may be observed, however, that a material of a composition may be quite useful even if it resembled known materials in all of its properties.

It is an object of this invention to provide for a blue-green stannous tin-activated phosphor whose emission characteristics are not as dependent upon the firing temperatures employed as those of the prior art.

A further object of this invention is to provide for violet-emitting phosphors which are activated by tin in the stannous state.

Another object of this invention is to provide for a barium magnesium pyrophosphate phosphor which can change in composition within limits but still have the same emission.

It is a further object of this invention to provide for ultra-violet emitting phosphors comprising ternary compositions whose peak emission wave length may be shifted between 3600 A. and 3970 A. according to changes in composition. The composition of these phosphors are primarily magnesium pyrophosphate activated by stannous tin with smaller amounts of barium and strontium pyrophosphate, all of which form a homogeneous phase.

Other objects, features and advantages of this invention will become apparent from the following specification and the accompanying drawings.

FIGURE 1 is a phase diagram of the basic magnesium pyrophosphate system as determined by X-ray analysis. The abscissa serves a dual purpose and is illustrative of the mole percent of each of the barium and magnesium pyrophosphate present in the system. At any point along the abscissa the combined amounts of the barium and magnesium totals one hundred percent. Thus, as the amount of magnesium present in the system is increased, the amount of barium present is concurrently decreased. The ordinate is the firing temperature.

Figure 1:
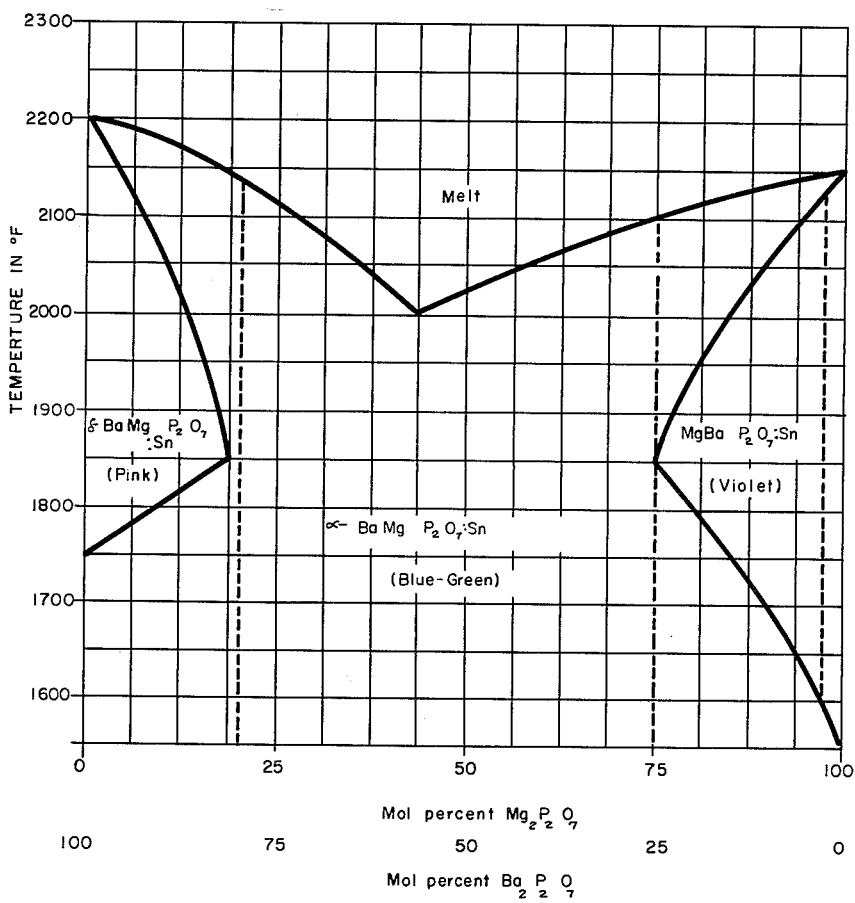
Figure 2:
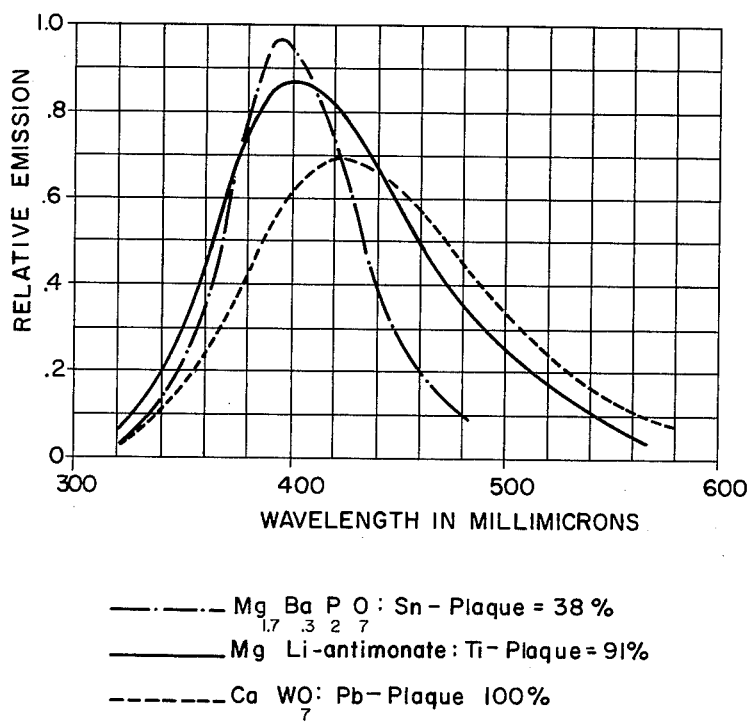
FIGURE 2 is a graph illustrative of the relative brightness of a phosphor prepared according to this invention. The graph further shows the relative brightness of two well-known and efficient phosphors for comparison purposes.

The $\alpha BaMgP_2O_7$:Sn phase is similar in structure to the low temperature form of barium pyrophosphate system; that is, $\alpha Ba_2P_2O_7$:Sn. The range of temperature stability, however, of this phosphor is quite wide. Of these two structures, both of the $\alpha Ba_2P_2O_7$:Sn and the $$\alpha BaMgP_2O_7 :Sn$$

phosphors produce a blue-green emission. The $$MgBaP_2O_7 :Sn$$

phase produce a violet emitting phosphor when activated by tin. This phase is the high temperature form of the invention and the structure resembles that of $Mg_2P_2O_7$:Sn phosphor.

Table I is a list of the X-ray powder diffraction patterns of the various structures of the barium-magnesium pyrophosphate phosphors which are prepared according to this invention. Listed together with these phosphors are comparative diffraction patterns of other phosphors exhibiting similar color emissions.

ting or the blue-green emitting phosphors the sum of the molar quantity of the magnesium and barium should substantially equal two.

The effect of the variation of the mole ratios of the barium to the magnesium and the change in firing temperatures is more apparent from Table II.

Column 1 recites the total moles of each of the barium and magnesium present in the system. The second column is similar to the first column, but here the amount of barium and magnesium present is recited in mole percent. This column generally corresponds to FIGURE 1 of the drawing. Column 3 is a list of the firing temperatures of the various raw material mixtures utilized to prepare the phosphors according to this invention. The structure and color columns (4 and 5 respectively) are showings of the phosphors prepared and their colors. The effect of the variation of the mole ratios and firing temperatures is most evident from these columns. The sixth column is of the plaque brightness of the various phosphors. The brightness of each of the three colors is determined by comparing the phosphor indicated to an arbitrary standard of the well known barium titanium phosphate phosphor which emits in a wide intense band across the visible spectrum and is therefore quite suitable for comparing phosphors of differing emission colors. (For Table II, see below.)

TABLE II

| Mole Ratios (in moles) | | Mole Percent | | Temp., °F. | X-ray Structure | Emission Color | Percent Plaque Brightness | | |
|---|---|---|---|---|---|---|---|---|---|
| Ba | Mg | Ba | Mg | | | | Blue | Green | Red |
| 2.00 | ---- | 100 | 0 | 2,000 | $\delta Ba_2P_2O_7$ | Pink | 5 | 5 | 100 |
| 1.75 | .25 | 87.5 | 12.5 | 1,900 | $\delta BaMgP_2O_7$ | ----do---- | 15 | 11 | 91 |
| 1.50 | .50 | 75 | 25 | 1,700 | $\alpha BaMgP_2O_7$ | Blue-Green | 27 | 16 | 14 |
| 1.25 | .75 | 62.5 | 37.5 | 1,700 | $\alpha BaMgP_2O_7$ | ----do---- | 55 | 69 | 32 |
| 1.00 | 1.00 | 50 | 50 | 1,800 | $\alpha BaMgP_2O_7$ | ----do---- | 39 | 27 | 28 |
| .75 | 1.25 | 37.5 | 62.5 | 1,600 | $\alpha BaMgP_2O_7$ | ----do---- | 56 | 39 | 37 |
| .50 | 1.50 | 25 | 75 | 1,600 | $\alpha BaMgP_2O_7$ | ----do---- | 48 | 34 | 42 |
| .25 | 1.75 | 12.5 | 87.5 | 1,600 | $(MgBa)_2P_2O_7$ | Violet | 32 | 20 | 19 |

TABLE I

| Main Lines (d lines) | $\delta$-$Ba_2P_2O_7$:Sn | $\delta$-$BaMgP_2O_7$:Sn |
|---|---|---|
| (1) | 3.87 | 3.91 |
| (2) | 2.69, 2.10 | 2.83 |
| (3) | 2.14 | 2.10, 2.14 |

| | $\alpha$-$Ba_2P_2O_7$:Sn | $\alpha$-$BaMgP_2O_7$:Sn |
|---|---|---|
| (1) | 3.56 | 3.72 |
| (2) | 2.13, 2.81 | 2.17, 2.79 |
| (3) | 1.94 | 2.99, 2.94 |

| | $Mg_2P_2O_7$:Sn | $MgBaP_2O_7$:Sn |
|---|---|---|
| (1) | 3.00 | 3.36, 3.00 |
| (2) | 2.95, 2.52 | 6.30 |
| (3) | 2.10 | 2.95 |

Referring to FIGURE 1 of the drawing, it will be observed that the various phosphors according to my invention can be formed by varying the proportions of $Mg_2P_2O_7$ and $Ba_2P_2O_7$ and the firing temperatures about 1850° F. being the most practical. I have found that the most efficient blue-green phosphors are produced when working within a range of ratios of about 20 mole percent $Mg_2P_2O_7$ and 80 mole percent $Ba_2P_2O_7$ to about 75 mole percent $Mg_2P_2O_7$ and 25 mole percent $Ba_2P_2O_7$. Hence for the blue-green phosphor, the materials has a formula of $\alpha(Ba_{0.5 \text{ to } 1.6}Mg_{0.4 \text{ to } 1.5})P_2O_7$:Sn. For the violet emitting phosphors I have found that the greatest efficiency is produced in a range of ratios between about 75 mole percent $Mg_2P_2O_7$ to 25 mole percent $Ba_2P_2O_7$ and about 97.5 mole percent $Mg_2P_2O_7$ to 2.5 mole percent $Ba_2P_2O_7$. Hence the formula for the violet phosphor can be $$(Ba_{0.05 \text{ to } 0.5}Mg_{1.5 \text{ to } 1.95})P_2O_7 :Sn$$

Not only is the violet phosphor new in luminescent color, but also in structure. In either the case of the violet emit- It is apparent from the foregoing table that the plaque brightness and the emission color are quite dependent upon both the firing temperature and the molar ratio of the barium to the magnesium.

The pink phosphor, $\delta$—$BaMgP_2O_7$:Sn, which is obtained at the hightest barium ratios is similar in structure and emission color to that described by McKeag, noted previously. However, although this phosphor is fairly bright it is not practical.

The violet phase phosphor, $MgBaP_2O_7$, would appear upon inspection to be relatively dull. This is due however, in a large degree to the lack of wave lengths to which the eye responds. The spectral emission energy is quite high as may be seen from FIGURE II of the drawings. Here the relative response of the two well known phosphors is compared to the violet phosphor of this invention. The subscript numerals of the magnesium and barium shown therein are calculated in mole percent. It is apparent from FIGURE II that the phosphor of this invention is far superior in peak height to other phosphors such as the well known and efficient calcium tungstate.

As a further aspect of this invention it has been determined that it is possible to vary the peak emission of the ultraviolet emitting phosphors between 3600 A. and 3900 A. by the formation of a ternary alkali earth pyrophosphate system which may be represented by the formula $Mg_xBa_ySr_zP_2O_7$:Sn wherein $x$ varies between 1.5 to 1.9, $y$ between 0.05 to 0.45 and $z$ between 0.05 and 0.45. The sum of $x$, $y$ and $z$ should substantially equal two.

Figure 3:
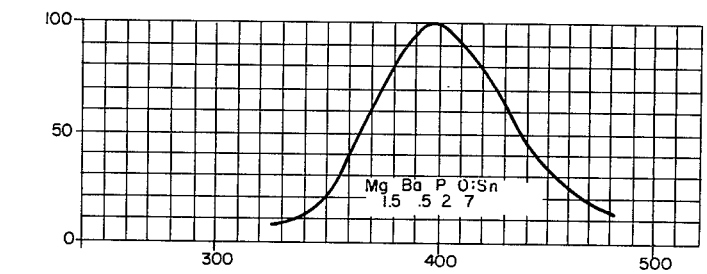
FIGURE 3 is a graph which shows the luminescent spectra of a magnesium-barium pyrophosphate phosphor prepared according to this invention.
Figure 4:
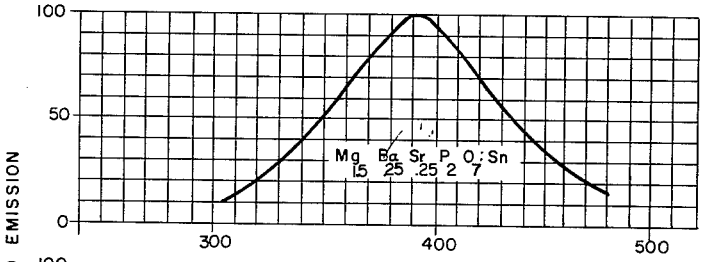
FIGURES 4 and 5 are graphs which show the luminescent spectra of a $Mg_yBa_ySr_zP_2O_7$:Sn phosphor prepared according to this invention.
Figure 5:
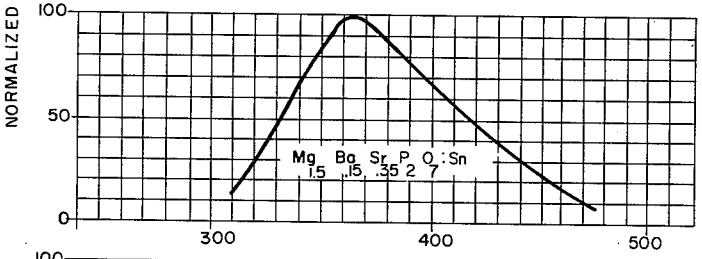
Figure 6:
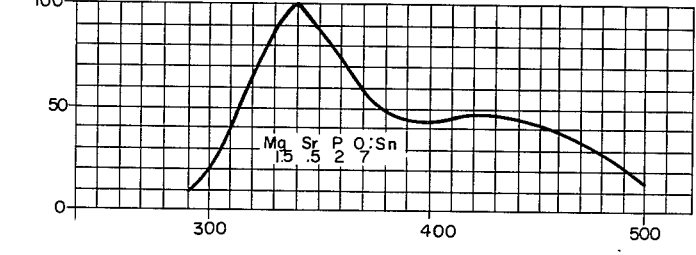
FIGURE 6 is a graph showing the luminescent spectra of a magnesium-strontium pyrophosphate phosphor.

In further explanation of these ternary pyrophosphate phosphors, reference is made to FIGURES 3 and 6. Each of these figures is a graph illustrative of the normalized emission plotted against the wave length of light emitted by various phosphors. The intensity of the most intense wave length, was set at 100 percent so as to give a relative comparison to the other emission wave lengths. It is significant to note that in the $Mg_xBa_ySr_zP_2O_7$:Sn phosphors (ternary pyrophosphates) there is but a single emission peak. In a system where the barium is absent, two peaks appear. An example of a system of this type is shown in FIGURE 6. This type of double peak is indicative of a non-homogeneous system.

In the preparation of phosphors according to this invention it is preferred to start with either stannous or stannic oxide as a source of the tin activator. It is possible, however, to use barium pyrophosphate and magnesium ammonium phosphate or ammonium phosphate combined with a barium and/or magnesium salt which decomposes to the oxide upon heating to yield the matrix material and to introduce the tin as a similar decomposable salt or as a phosphate or a halide.

For the preparation of the blue-green phosphor the preferred components are $BaHPO_4$, $Mg_2P_2O_7$ or $$MgNH_4PO_4 \cdot H_2O$$

and SnO. For the ultraviolet phosphors it is preferred to use MgO, $(NH_4)_2HPO_4$, $BaHPO_4$ and SnO.

In any of the preparations of phosphors according to this invention the amounts of raw materials selected will depend upon the precise phosphor desired which should be in accord with FIGURE 1 of the drawing. The amount of the internal reducing gas, i.e., $NH_3$, utilized will depend upon the size of the crucible and the amount of raw materials. For a two liter crucible it is preferred to use .12 to 1.4 moles of ammonia per mole of phosphor. The amount of tin activator present in the mixture is prepared to lie within the range of 0.005 to 0.30 mole of tin per mole of pyrophosphate.

After the appropriate proportions of raw materials are ascertained, the mixture is prepared by dry ball milling or ball milling in water or acetone. It is apparent that other methods of mixing may be equally applicable.

When the mixture is prepared, it is then fired in a covered crucible at the appropriate temperature as determined from FIGURE 1. The optimum firing time for a covered two liter silica crucible is about two hours.

Illustrative of methods of preparation of phosphors according to this invention are the following examples. These examples are intended only as further explanation of the invention and are not to be considered limitative upon the claims.

*Example I*

PREPARATION OF $\alpha BaMgP_2O_7$: Sn
[Blue-green emitting phosphor]

| Components: | Weight (in grams) |
|---|---|
| $BaHPO_4$ | 2800 |
| $Mg_2P_2O_7$ | 445 |
| $(NH_4)_2HPO_4$ | 53 |
| SnO | 54 |
| $NH_4Cl$ | 111 |

The mixture of the raw materials indicated above are hammer milled twice. A blending operation is performed between each of the hammer milling steps. The resulting mixture is then fired in a covered seven inch crucible for two hours at 1700° F. A blue-green emitting phosphor is obtained which is excited by discharges of 2537 A.

*Example II*

PREPARATION OF $\alpha BaMgP_2O_7$: Sn
[Blue-green emitting phosphor]

| Components: | Weight (in grams) |
|---|---|
| $BaHPO_4$ | 1867 |
| $Mg_2P_2O_7$ | 890 |
| $(NH_4)_2HPO_4$ | 53 |
| SnO | 54 |
| $NH_4Cl$ | 111 |

The mixture is prepared in the hammer milling and blending operation in a similar manner as is described in Example I, above. The resulting mixture is then fired in a covered seven rich crucible for two hours at 1800° F. A blue-green phosphor is obtained which is excited by discharges of 2537 A.

*Example III*

PREPARATION OF $MgBaP_2O_7$: Sn
[Violet emitting phosphor]

| Components: | Weight (in grams) |
|---|---|
| $BaHPO_4$ | 467 |
| $Mg_2P_2O_7$ | 1558 |
| $(NM_4)_2HPO_4$ | 53 |
| SnO | 54 |
| $NH_4Cl$ | 111 |

The raw materials are mixed in a manner similar to that described in Example I, above. The mixture is then fired in a covered crucible for two hours at 2100° F. A violet emitting phosphor is produced which is responsive to excitation at 2537 A. The peak emission is at 3970 A.

*Example IV*

PREPARATION OF $MgBaP_2O_7$:Sn
[Violet emitting phosphor]

| Components | Weight (in grams) | Moles |
|---|---|---|
| MgO | 60.5 | 1.5 |
| $(NH_4)_2HPO_4$ | 208.7 | 1.5 |
| $BaHPO_4$ | 116.7 | .5 |
| SnO | 10.8 | .08 |

The mixture is prepared for firing in a manner similar to that described in Example I, above. After grinding and blending, it is fired in a covered crucible for two hours at 2100° F. A violet emitting phosphor is produced which emits at 3970 A. when excited at 2537 A.

*Example V*

PREPARATION OF $Ba_xMg_ySr_zP_2O_7$ PHOSPHOR

| Components | Weight (in grams) | Moles |
|---|---|---|
| MgO | 60.5 | 1.5 |
| $(NH_4)_2HPO_4$ | 198.1 | 1.5 |
| SnO | 10.8 | .08 |
| $BaHPO_4$ | 58.3 | .25 |
| $SrHPO_4$ | 45.9 | .25 |

The mixture is prepared in a similar manner as described in Example I, above. After blending and milling it is fired for 1¼ hours at 1800° F. in a covered seven inch crucible. A phosphor emitting at 3890 A. under 2537 A. excitation is produced.

*Example VI*

PREPARATION OF $Mg_xBa_ySr_zP_2O_7$:Sn
[Ultraviolet emitting phosphor]

| Components | Weight (in grams) | Moles |
|---|---|---|
| $BaHPO_4$ | 35.0 | .15 |
| MgO | 60.5 | 1.5 |
| $(NH_4)_2HPO_4$ | 198.1 | 1.5 |
| SnO | 10.8 | .08 |
| $SrHPO_4$ | 64.3 | .35 |

The mixture is prepared in a manner similar to that described in Example I, above. After this preparation, it is fired in a closed crucible at 1¼ hours at 1800° F. to produce an ultraviolet emitting phosphor with peak energy at 3640 A. when excited by light at 2537 A.

The firing in each of these specific examples has been done in a single step. Further, the firings in each of the examples has been done in a covered crucible. This closed crucible type of firing is highly desirable since it allows for a greater uniformity in batch composition and firing temperatures throughout the mass of reactant raw materials. It is apparent that firing in a single step is desirable since it allows for a reduction of process steps and consequently reduces the time occupied in preparation.

It is apparent that modifications may be made within the spirit and scope of my invention, but it is my intention however, only to be limited in this invention by the scope of the appended claims.

As my invention, I claim:

1. A blue-green emitting phosphor having the formula $\alpha(Ba_{0.5\ to\ 1.6}Mg_{0.4\ to\ 1.5})P_2O_7:Sn_{0.005\ to\ 0.3}$ wherein the sum total of the barium and magnesium cations is substantially two.

2. A violet emitting phosphor having the formula $(Ba_{0.05\ to\ 0.5}Mg_{1.5\ to\ 1.95})P_2O_7:Sn_{0.005\ to\ 0.3}$ wherein the sum total of the barium and magnesium cations is substantially two.

3. A blue-green emitting barium magnesium pyrophosphate phosphor activated by tin in quantities between about 0.005 to 0.3 gram atoms per mole of pyrophosphate wherein the amount of magnesium calculated as magnesium pyrophosphate is between about 20 and 75 mole percent and the amount of barium calculated as barium pyrophosphate is between about 25 and 80 mole percent and wherein the total of barium and magnesium equal 100 mole percent.

4. A violet emitting barium-magnesium pyrophosphate phosphor activated by tin in quantities between about 0.005 to 0.3 gram atoms per mole of pyrophosphate wherein the amount of barium calculated as barium pyrophosphate is between about 2.5 to 25 mole percent and the amount of magnesium calculated as magnesium pyrophosphate is between about 75 and 97.5 mole percent and wherein the total of barium and magnesium equal 100 mole percent.

5. A ternary alkaline earth pyrophosphate phosphor having the formula $Mg_xBa_ySr_zP_2O_7:Sn$ where $x$ is between about 1.5 and 1.9 and $y$ is between about 0.05 and 0.45 and $z$ is between about 0.05 and 0.45 and the total of $x$ and $y$ and $z$ is substantially 2 and wherein the tin is present in quantities between about 0.005 to 0.3 mole per mole of pyrophosphate.

6. An $\alpha BaMgP_2O_7:Sn$ phosphor having a blue-green emission color and wherein the tin is present in the matrix in quantities between about 0.005 to 0.3 gram atoms per mole of pyrophosphate.

7. A $(Ba_{0.05\ to\ 0.5}Mg_{1.5\ to\ 1.95})P_2O_7:Sn$ phosphor having a violet emission color and wherein the tin is present in the matrix in quantities between about 0.005 to 0.3 gram atoms per mole of pyrophosphate.

References Cited by the Examiner

UNITED STATES PATENTS 2,730,504   1/56   McKeag _____ 252—301.4

FOREIGN PATENTS 746,289   3/56   Great Britain.

MAURICE A. BRINDISI, *Primary Examiner.*